United States Patent
Flannigan et al.

(10) Patent No.: US 10,065,056 B2
(45) Date of Patent: Sep. 4, 2018

(54) UNITARY RESPIRATOR WITH MOLDED THERMOSET ELASTOMERIC ELEMENTS

(71) Applicant: 3M INNOVATIVE PROPERTIES COMPANY, St. Paul, MN (US)

(72) Inventors: Paul J. Flannigan, Plymouth, MN (US); Johannes Hoogenraad, Plymouth, MN (US); David P. Knivsland, North St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 714 days.

(21) Appl. No.: 14/573,301

(22) Filed: Dec. 17, 2014

(65) Prior Publication Data

US 2015/0128936 A1 May 14, 2015

Related U.S. Application Data

(63) Continuation of application No. 12/670,556, filed as application No. PCT/US2008/070043 on Jul. 15, 2008.

(Continued)

(51) Int. Cl.
*A62B 18/02* (2006.01)
*A62B 18/08* (2006.01)
(Continued)

(52) U.S. Cl.
CPC ............ *A62B 18/025* (2013.01); *A62B 18/08* (2013.01); *A62B 18/084* (2013.01); *A62B 18/10* (2013.01);
(Continued)

(58) Field of Classification Search
CPC ............ A61M 16/06–16/0655; A61M 16/105; A61M 16/20–16/201; A61M 16/206–16/209; A61M 2016/0661
See application file for complete search history.

(56) References Cited

U.S. PATENT DOCUMENTS 4,308,094 A * 12/1981 Miyoshi .................... D21J 3/12
162/135
4,414,973 A 11/1983 Matheson et al.
(Continued)

FOREIGN PATENT DOCUMENTS

EP 0613699 9/1994
GB 1360632 7/1974
(Continued)

OTHER PUBLICATIONS

ShinEtsu Silicone LIMS Selective Self-Adhesive Liquid Silicon Product Brochure, 2001.
(Continued)

*Primary Examiner* — Rachel T Sippel

(57) ABSTRACT

A respiratory protection composite facepiece is disclosed and includes a polymeric rigid facepiece body portion having a first surface and a second surface and a silicone sealing facepiece element chemically bonded at least one of the first surface or the second surface. The first and second surfaces can be opposing major surfaces. A second silicone element is chemically bonded to at least one of the first surface or the second surface. Methods of making the same are also disclosed.

5 Claims, 6 Drawing Sheets

Related U.S. Application Data

(60) Provisional application No. 60/999,743, filed on Aug. 31, 2007.

(51) Int. Cl.
  *A62B 18/10* (2006.01)
  *B29C 45/14* (2006.01)
  *B29C 45/16* (2006.01)
  *A62B 23/02* (2006.01)
  *B29C 65/48* (2006.01)
  *B29D 99/00* (2010.01)
  B29K 83/00 (2006.01)
  B29L 31/48 (2006.01)
  B29K 81/00 (2006.01)

(52) U.S. Cl.
  CPC ...... *A62B 23/025* (2013.01); *B29C 45/14311* (2013.01); *B29C 65/483* (2013.01); *B29D 99/0053* (2013.01); *B29C 45/1657* (2013.01); *B29C 2045/14327* (2013.01); *B29K 2081/00* (2013.01); *B29K 2083/005* (2013.01); *B29L 2031/4835* (2013.01); *Y10T 29/4998* (2015.01)

(56) References Cited

U.S. PATENT DOCUMENTS

| | | | |
|---|---|---|---|
| 4,508,936 A * | 4/1985 | Ingalls | A62B 18/08 128/201.19 |
| 4,790,306 A | 12/1988 | Braun | |
| 4,886,058 A | 12/1989 | Brostrom et al. | |
| 4,910,806 A | 3/1990 | Baker | |
| 5,062,421 A | 11/1991 | Burns et al. | |
| 5,062,431 A | 11/1991 | Burns et al. | |
| 5,095,936 A | 3/1992 | Briet et al. | |
| 5,325,892 A | 7/1994 | Japuntich et al. | |
| 5,592,937 A | 4/1997 | Freund | |
| 5,720,280 A | 2/1998 | Elstran et al. | |
| 6,016,804 A | 1/2000 | Gleason et al. | |
| 6,176,239 B1 | 1/2001 | Grove et al. | |
| 6,216,693 B1 | 4/2001 | Rekow | |
| 6,298,841 B1 | 10/2001 | Cheng et al. | |
| 6,843,248 B2 | 1/2005 | Japuntich et al. | |
| 6,854,463 B2 | 2/2005 | Japuntich et al. | |
| 6,883,518 B2 | 4/2005 | Mittelstadt | |
| 7,117,868 B1 | 10/2006 | Japuntich et al. | |
| 8,820,326 B2 | 9/2014 | Flannigan et al. | |
| 8,839,788 B2 | 9/2014 | Betz | |
| 2001/0013347 A1 | 8/2001 | Rekow | |
| 2001/0035188 A1 | 11/2001 | Gleason et al. | |
| 2002/0094414 A1 | 1/2002 | Wagenblast | |
| 2002/0020416 A1 | 2/2002 | Namey | |
| 2002/0170563 A1 | 11/2002 | Japuntich et al. | |
| 2002/0185133 A1 | 12/2002 | Japuntich et al. | |
| 2002/0195109 A1 | 12/2002 | Mittelstadt | |
| 2003/0084902 A1 | 5/2003 | Japuntich et al. | |
| 2003/0153934 A1 | 8/2003 | Gerberding | |
| 2004/0025880 A1 | 2/2004 | Capon et al. | |
| 2004/0149287 A1 | 8/2004 | Namey | |
| 2005/0109343 A1 | 5/2005 | Flannigan et al. | |
| 2006/0117469 A1 | 6/2006 | Garofalo et al. | |
| 2007/0119459 A1 | 5/2007 | Japuntich et al. | |
| 2009/0032024 A1 | 2/2009 | Burz et al. | |
| 2010/0218761 A1 | 9/2010 | Flannigan et al. | |

FOREIGN PATENT DOCUMENTS

| | | |
|---|---|---|
| JP | 2006-289093 | 10/2006 |
| WO | 1993/24181 | 12/1993 |
| WO | WO 2004/052439 | 6/2004 |
| WO | WO 2005/051490 | 6/2005 |
| WO | WO 2005/063327 | 7/2005 |
| WO | WO 2005/065781 | 7/2005 |
| WO | WO 2007/009182 | 1/2007 |

OTHER PUBLICATIONS

ShinEtsu LIMS Product Selection Guide, 2007.
Wacker Silicones Elastosil® LR3070 A, B Product Brochure, 2007.

\* cited by examiner

UNITARY RESPIRATOR WITH MOLDED THERMOSET ELASTOMERIC ELEMENTS

FIELD

The present disclosure relates to a unitary respirator with molded thermoset elastomeric elements and particularly to a respirator facepiece with a thermoset elastomeric face seal and another thermoset elastomeric element.

BACKGROUND

Half-mask respirators provide respiratory protection from airborne substances with filtering processes and/or otherwise facilitating access to clean air. One characteristic of these devices is the seal that is formed between the user and other functional components of the respirator. Respirators often utilize an elastomeric material to form the seal which is often referred to as the "faceseal."

One design consideration with these respirators is the air-tight fastening of the elastomeric faceseal with the solid structural components of the respirator. This air-tight seal often requires a mechanical seal that adds complexity and cost to the respirator design. Another design consideration is the formation and attachment of other elastomeric elements of the respirator. These other elastomeric elements also add complexity and cost to the respirator design.

BRIEF SUMMARY

The present disclosure relates to a unitary respirator with molded thermoset elastomeric elements and particularly to a respirator facepiece with a thermoset elastomeric face seal and another thermoset elastomeric element. This disclosure further relates to a respirator facepiece having a polymeric rigid facepiece body portion and a silicone sealing facepiece element and a second silicone element that is chemically bonded to at least one major surface of the polymeric rigid facepiece body portion. In many embodiments, the silicone sealing facepiece element and a second silicone element is chemically bonded to at least two major surfaces of the polymeric rigid facepiece body portion. In some embodiments, the silicone sealing facepiece element and the second silicone element penetrates through at least one aperture in the polymeric rigid facepiece body portion.

In a first embodiment, a respiratory protection composite facepiece includes a polymeric rigid facepiece body portion having a first surface and a second surface and a silicone sealing facepiece element chemically bonded to at least one of the first surface or the second surface. The first and second surfaces can be opposing major surfaces. A second silicone element is chemically bonded to at least one of the first surface or the second surface. In some embodiments, the silicone sealing facepiece element and/or second silicone element may be chemically bonded to at least two opposing major surfaces of the polymeric rigid facepiece body portion. The silicone sealing facepiece element and/or second silicone element may in some cases also interpenetrate apertures that extend through the polymeric rigid facepiece body portion. The second silicone element may form a diaphragm for the inhalation valve, the exhalation valve, or speaking diaphragm, or form a sealing gasket about an inhalation port, or form at least a portion of headstraps.

In another embodiment, a respiratory protection composite facepiece includes a polymeric rigid facepiece body portion having a first surface and a second surface and an inhalation port. A silicone sealing facepiece element is chemically bonded to at least one of the first surface or the second surface and forming a gasket about the inhalation port. The first and second surfaces can be opposing major surfaces. The gasket is chemically bonded to at least one of the first surface or the second surface. In some embodiments, the silicone sealing facepiece element and/or gasket may be chemically bonded to at least two opposing major surfaces of the polymeric rigid facepiece body portion. The silicone sealing facepiece element and/or gasket may in some cases also interpenetrate apertures that extend through the polymeric rigid facepiece body portion.

In a further embodiment, a method of forming a respiratory protection composite facepiece includes overmolding liquid silicone onto a polymeric rigid facepiece body portion having a first surface and a second surface, where the liquid silicone is in contact with at least one of the first surface or the second surface, and solidifying the liquid silicone to form a silicone sealing facepiece element that chemically bonds to one of the first surface or the second surface. A second silicone element is chemically bonded to at least one of the first surface or the second surface, forming a respiratory protection composite facepiece. The second silicone element may form a diaphragm for the inhalation valve, the exhalation valve, or speaking diaphragm, or form a sealing gasket about an inhalation port, or form at least a portion of headstraps In a still further embodiment, a method of forming a respiratory protection composite facepiece includes overmolding liquid silicone onto a polymeric rigid facepiece body portion having a first surface and a second surface, where the liquid silicone is in contact with at least one of the first surface or the second surface, and solidifying the liquid silicone to form a silicone sealing facepiece element that chemically bonds to one of the first surface or the second surface, and forming a gasket about the inhalation port.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
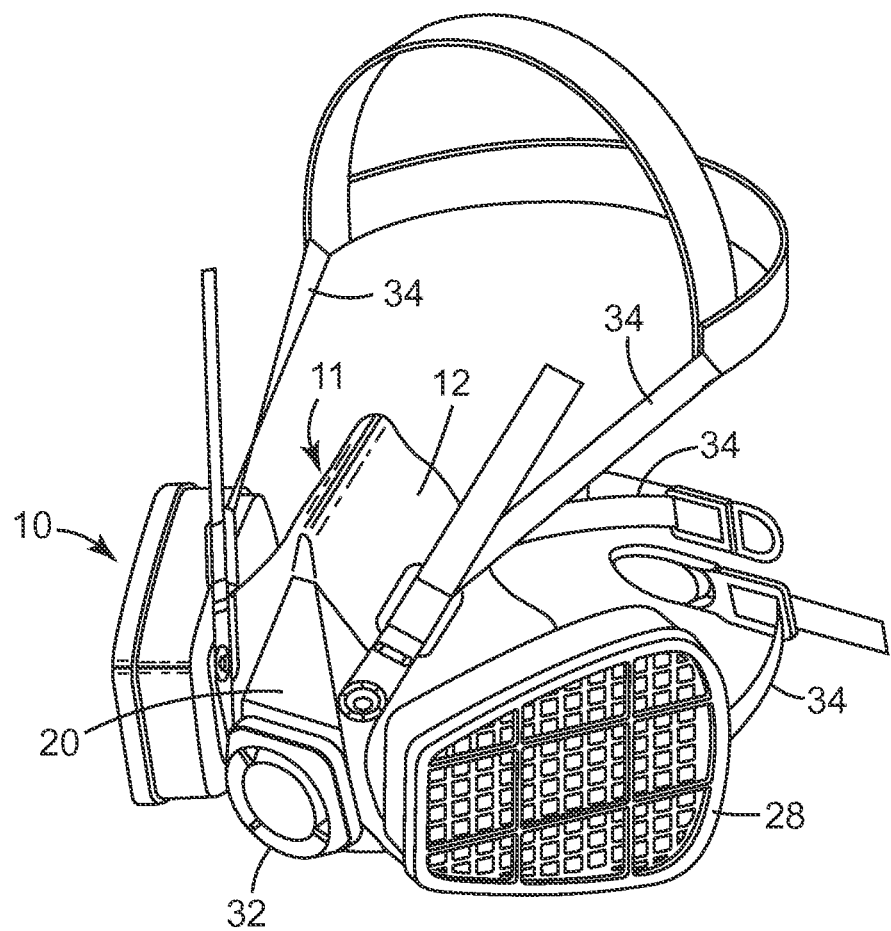
FIG. 1 is a perspective view of an illustrative respiratory protection mask.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "respirator" means a personal respiratory protection device that is worn by a person to filter air before the air enters the person's respiratory system. This term includes full face respirators, half mask respirators, supplied air hoods, powered air purifying respirators, and self contained breathing apparatus.

The present disclosure relates to a unitary respirator with molded thermoset elastomeric elements and particularly to a respirator facepiece with a thermoset elastomeric face seal and another thermoset elastomeric element. The present disclosure also relates to a respirator facepiece having an inhalation port and a thermoset elastomeric face seal that also surrounds the inhalation port forming an inhalation port gasket. This disclosure further relates to a respirator facepiece having a polymeric rigid facepiece body portion and a silicone sealing facepiece element and a second silicone element that is chemically bonded to one or two major surfaces of the polymeric rigid facepiece body portion. In some embodiments, the silicone sealing facepiece element and the second silicone element also penetrates through the polymeric rigid facepiece body portion. This respirator facepiece can be formed by molding a thermoset silicone sealing facepiece element and a second silicone element onto the polymeric thermoplastic rigid facepiece body portion sequentially or at the same time. These respirator facepieces have a robust bond between the silicone elements and the rigid facepiece body portion. While the present invention is not so limited, an appreciation of various aspects of the invention will be gained through a discussion of the examples provided below.

The unitary respirator having an overmolded thermoset elastomeric seal and another overmolded element provides a face sealing element and other elastomeric element that is integrally or chemically bonded with the polymeric rigid facepiece body portion. This construction has been found to enhance the durability of the elastomeric elements and prevent debris from being interposed between the polymeric rigid facepiece body portion and the thermoset elastomeric elements. This integral construction also reduces the number of assembly parts and part size variability. The overmolded thermoset elastomeric materials described herein also do not require that the polymeric rigid facepiece body portion be primed in order for the thermoset elastomeric elements to be chemically attached or bonded to the polymeric rigid facepiece body portion.

FIG. 1 is a perspective view of an illustrative respiratory protection mask 10. The respiratory protection mask 10 includes a respiratory protection composite facepiece 11 attached to number of respiratory protection elements including, for example, one or more inhalation valves with an optional chemical or particulate filtration cartridge 28 connected to one or more of the inhalation valves, one or more exhalation valves 32, one or more speaking diaphragms and/or one or more headstraps or straps 34 configured to secure the respiratory protection composite facepiece 11 to a user's head.

The respiratory protection composite facepiece 11 includes a silicone sealing facepiece element 12 overmolded onto a polymeric rigid facepiece body 20 (as described in more detail below). The chemical or particulate filtration cartridge 28 to can be either fixedly attached or removably attached to the one or more of the inhalation valves. In some embodiments, the silicone sealing facepiece element 12 also forms a seal or gasket (as described in more detail below) between the chemical or particulate filtration cartridge 28 and the polymeric rigid facepiece body 20 or inhalation valve (as described in more detail below). The chemical or particulate filtration cartridge 28 can have any useful shape, other than the shape illustrated in FIG. 1.

While FIG. 1 illustrates a respiratory protection mask 10 having two cheek inhalation valves attached to a chemical or particulate filtration cartridge 28 and one nose exhalation valve 32, any useful respiratory protection configuration is possible. For example, the respiratory protection mask 10 can have a single inhalation valve attached to a chemical or particulate filtration cartridge 28 or clean air supply and one or two exhalation valves or one or more speaking diaphragms, as desired.

Figure 2:
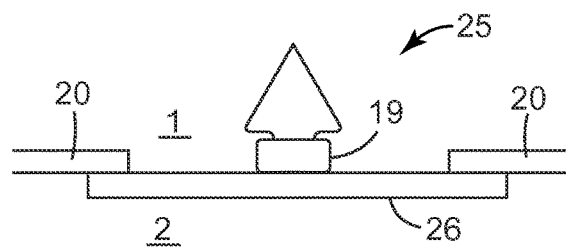
FIG. 2 and FIG. 3 are schematic cross-section views of an illustrative inhalation or exhalation diaphragm valve.
Figure 3:
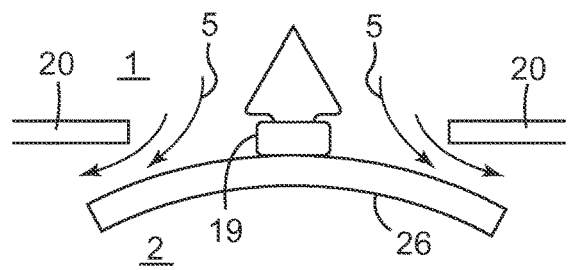
Figure 4:
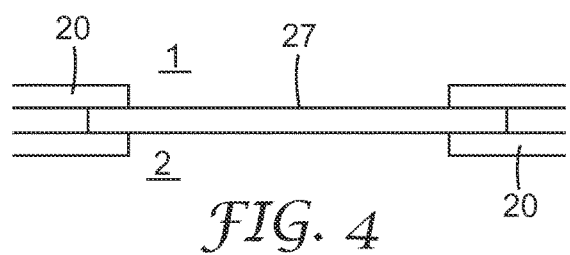
FIG. 4 is a schematic cross-section view of an illustrative speaking diaphragm.

FIG. 2 and FIG. 3 are schematic cross-section views of an illustrative inhalation or exhalation valve. FIG. 4 is a schematic cross-section view of an illustrative speaking diaphragm. These inhalation or exhalation valves or speaking diaphragm are located within or adjacent to the plurality of openings of the rigid facepiece body 20, described below.

FIG. 2 illustrates a partial schematic diagram of a diaphragm valve disposed between an exterior area 1 or 2 and an interior area 2 or 1 of the illustrative respiratory protection mask 10. The valve 25 is an inhalation valve when the diaphragm 26 is disposed between the rigid facepiece body 20 and the user's face or the interior area 2 of the illustrative respiratory protection mask 10. The valve 25 is an exhalation valve when the diaphragm 26 is disposed between the rigid facepiece body 20 and the exterior area 1 of the illustrative respiratory protection mask 10. FIG. 3 illustrates the valve allowing either inhalation air 5 or exhalation air 5 to pass between the diaphragm 26 and the valve body or rigid facepiece body 20. The exemplary diaphragm 26 is attached to a valve support element 19 that anchors the diaphragm 26 to the valve body or rigid facepiece body 20. One or more struts 17 (see FIG. 5) can connect the support element 19 that anchors the diaphragm to the valve body or rigid facepiece body 20.

FIG. 4 illustrates a partial schematic diagram of a speaking diaphragm. The illustrative speaking diaphragm includes a diaphragm 27 fixed to the rigid facepiece body 20. While the diaphragm 27 is illustrated being sandwiched between two rigid facepiece body 20 body portions, the diaphragm 27 may be simply chemically bonded to one or both of the first surface and a second surface (described below) and may penetrate through at least one aperture in the polymeric rigid facepiece body portion (described generally below). The diaphragm 27 is disposed between the exterior area 1 or 2 and an interior area 2 or 1 of the illustrative respiratory protection mask 10. The speaking diaphragm 27 assists in the transmission of speech from the respiratory protection mask 10 user.

Figure 5:
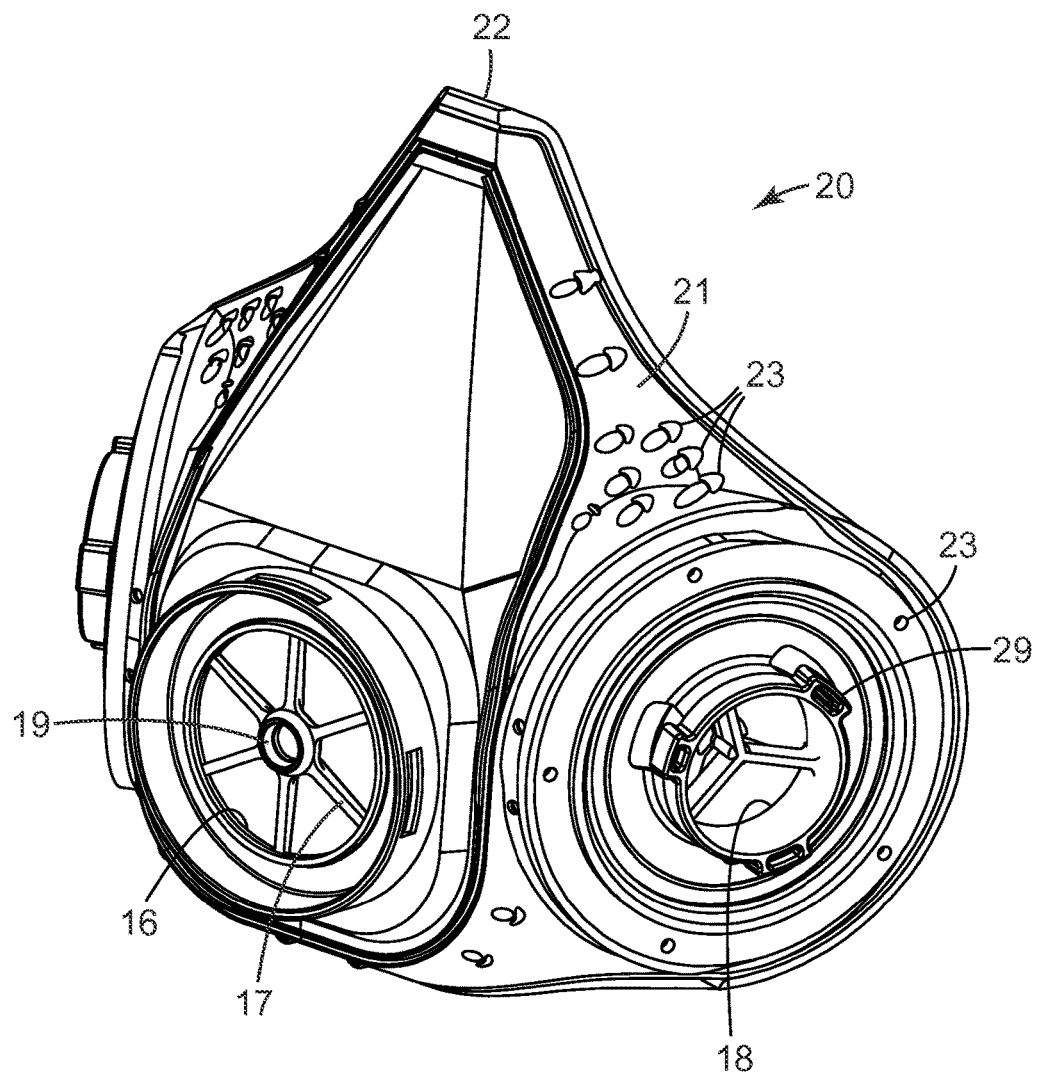
FIG. 5 is a perspective view of an illustrative rigid facepiece body for a respirator protection mask.

FIG. 5 is a perspective front view of an illustrative rigid facepiece body 20 for a respirator protection mask 10. The rigid facepiece body 20 includes a first surface 21 and a second surface 22. In the illustrated embodiment, the first surface 21 and a second surface 22 are opposing major surfaces of the rigid facepiece body 20, separated by a body thickness T. In the illustrated embodiment, the first surface 21 is an outer surface (directed toward the environment) and the second surface 22 is an inner surface (directed toward a user's face). The illustrated rigid facepiece body 20 includes a plurality of openings or ports such as, for example, a nose opening 16 and two cheek openings 18. At least one inhalation valve including a diaphragm (not shown) and one exhalation valve including a diaphragm (not shown) are disposed within the plurality of ports or openings and forms the illustrated rigid facepiece body 20. In some embodiments, a speaking diaphragm is disposed within one or more of the plurality of ports or openings.

In many embodiments, one or more apertures 23 extend through the body thickness T. During the overmolding manufacture of the respiratory protection composite facepiece 11 liquid silicone (that forms the silicone sealing facepiece element 12) flows through the one or more apertures 23 and forms a mechanical interlock between the silicone sealing facepiece element 12 and the rigid facepiece body 20. In some embodiments, the inhalation valve includes a chemical or particulate filtration cartridge attachment element 29. In many embodiments, the attachment element 29 is a bayonet attachment element that mates with a complementary element on the chemical or particulate filtration cartridge attachment element 29. A bayonet attachment system is configured for attaching two portions together, where the two portions include elements other than mainly threads such that the two portions are attached by inserting one portion at least partially within the other portion and rotating one portion relative to the other portion so that the two portions can be joined without multiple turns.

Figure 6:
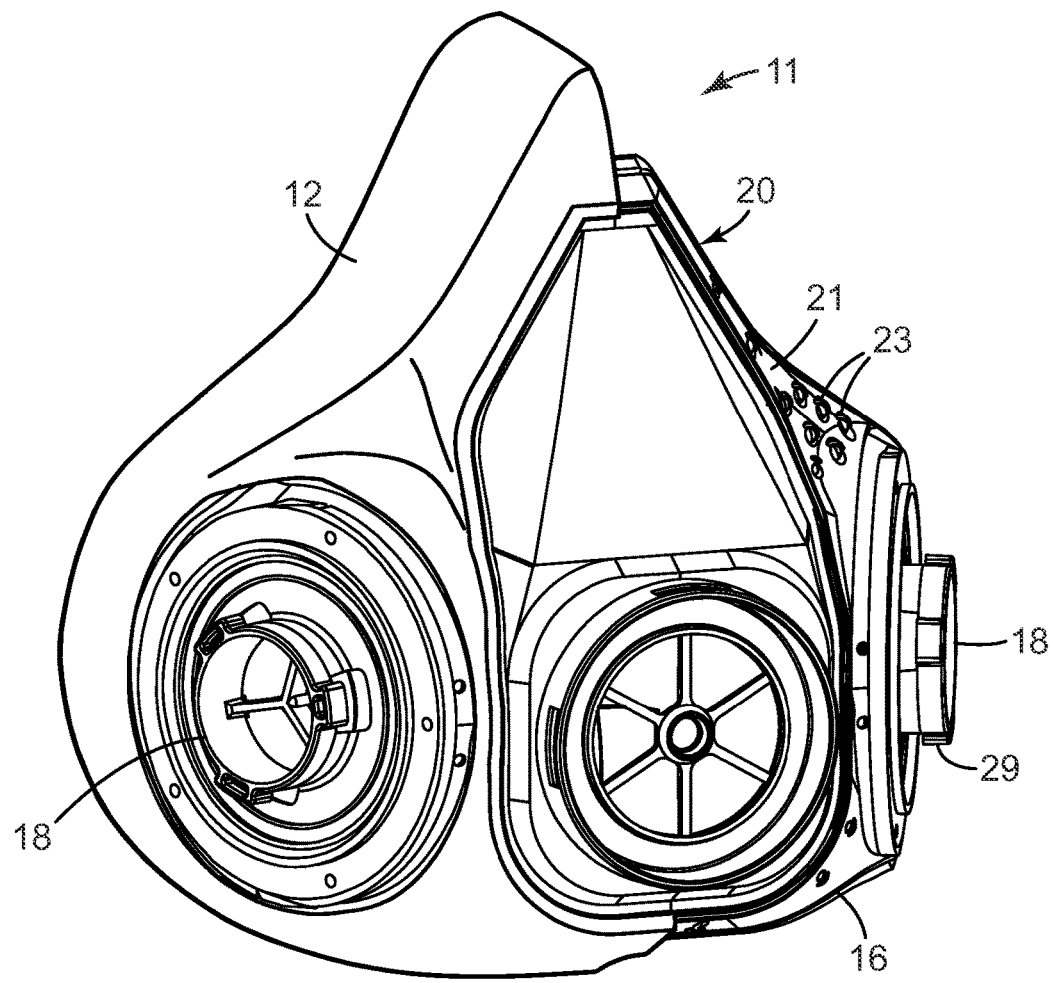
FIG. 6 is a perspective front view of the rigid facepiece body shown in FIG. 5 illustrating a silicone sealing facepiece element overmolded onto half of the rigid facepiece body.
Figure 7:
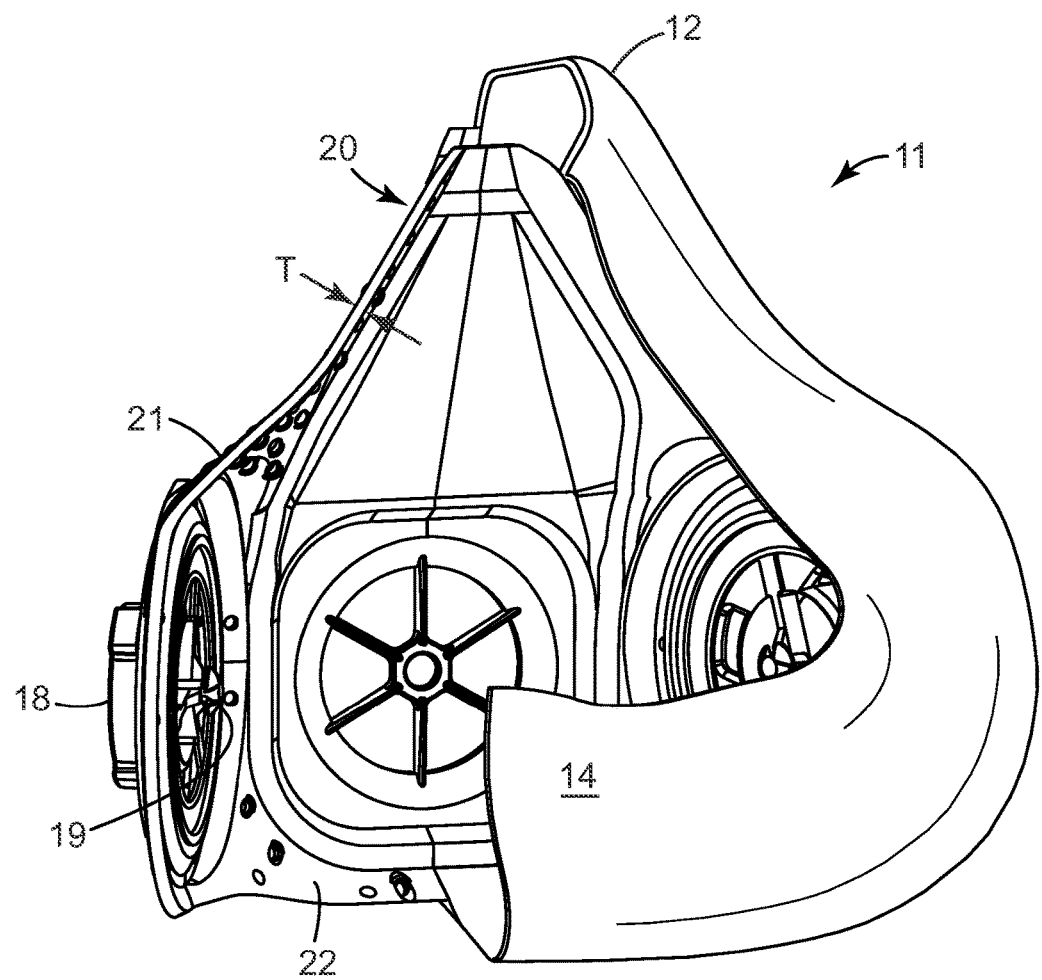
FIG. 7 is a perspective rear view of the rigid facepiece body shown in FIG. 5 illustrating a silicone sealing facepiece element overmolded onto half of the rigid facepiece body.

FIG. 6 is a perspective front view of the rigid facepiece body 20 shown in FIG. 5 with a silicone sealing facepiece element 12 overmolded onto half of the rigid facepiece body 20. FIG. 7 is a perspective rear view of the rigid facepiece body shown in FIG. 5 with a silicone sealing facepiece element overmolded onto half of the rigid facepiece body. It is understood that the exemplary respiratory protection composite facepiece 11 includes the silicone sealing facepiece element 12 overmolded onto both halves of the rigid facepiece body 20, but is shown as a cross-section of the silicone sealing facepiece element 12 to more easily illustrate the contour of the silicone sealing facepiece element 12.

The rigid facepiece body 20 is described above. The silicone sealing facepiece element 12 is chemically bonded to at least one of a first surface and a second surface of the rigid facepiece body 20, such the first surface 21 and/or the second surface 22. In many embodiments, the silicone sealing facepiece element 12 is chemically bonded to at least one of the first surface 21 and the second surface 22, where the first surface 21 and a second surface 22 are major surfaces of the rigid facepiece body 20, separated by a body thickness T, as described above.

A second silicone element is chemically bonded to at least the first surface 21 and/or the second surface 22. The second silicone element can be any silicone element or component useful in a respiratory protection mask. The second silicone element can be, for example, a diaphragm for the inhalation valve, exhalation valve, or speaking diaphragm, or form a sealing gasket about an inhalation port, or form at least a portion of headstraps, for example. The second silicone element can be formed (e.g., overmolded) at the same time or sequentially as the silicone sealing facepiece element 12 is formed (e.g., overmolded).

During the overmolding manufacture of the respiratory protection composite facepiece 11 liquid silicone (that forms the silicone sealing facepiece element 12 or second silicone element) flows through the one or more apertures 23 and forms a mechanical interlock between the silicone sealing facepiece element 12 and the rigid facepiece body 20 once the liquid silicone is cured to its solid state. During this overmolding process, or in a sequential overmolding process, the second silicone element is formed by liquid silicone that flows onto at least the first surface 21 and/or the second surface 22 and optionally through one or more apertures in the mask body and forms a mechanical interlock between the mask body and the second silicone element, once the liquid silicone is cured to its solid state.

Figure 8:
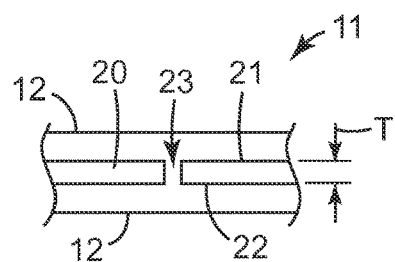
FIG. 8 is a schematic cross-sectional view of portion of a respiratory protection composite facepiece illustrating a mechanical interlock created when the liquid silicone interpenetrates an aperture through the rigid facepiece body.

FIG. 8 illustrates a schematic cross-sectional view of portion of a respiratory protection composite facepiece 11 illustrating a mechanical interlock created when the liquid silicone interpenetrates an aperture 23 through the rigid facepiece body 20. The silicone sealing facepiece element 12 and/or second silicone element can be disposed on and chemically bonded to the first surface 21 and/or the second surface 22, where the first surface 21 and a second surface 22 are major surfaces of the rigid facepiece body 20, separated by a body thickness T, as described above.

Referring back to FIG. 6 and FIG. 7, the silicone sealing facepiece element 12 is configured to form an air-tight seal between a user's head or face and the rigid facepiece body 20. The term "air-tight seal" refers to a connection of the silicone sealing facepiece element 12 to the user's face or head that substantially prevents unfiltered or ambient air from entering an interior portion of the respiratory protection composite facepiece 11 at the connection interface. The illustrated silicone sealing facepiece element 12 includes an in-turned feathered cuff 14 that contacts a user's face.

Air-tightness is measured with a vacuum leak test. The test fixture consists of a sealed chamber with three ports. The volume of the chamber is approximately 750 $cm^3$. A respirator attachment component is affixed to one of the three ports by means of its bayonet attachment element. A vacuum gauge capable of measuring the pressure differential between the inside of the chamber and the ambient air (to at least 25 cm water) is attached to a second port on the fixture.

A vacuum source is attached to the third port through a shut off valve. To conduct the test, the shut-off valve is opened and the vacuum source is turned on to evacuate the chamber to a pressure of 25 cm water below atmospheric pressure (as indicated by the vacuum gauge). The shut-off valve is then closed and the vacuum source is turned off. The vacuum level inside the chamber is monitored for 60 seconds. Inward leakage of air causes the pressure inside the chamber to increase, thereby reducing the vacuum level. For the current invention, the pressure differential between the chamber and the ambient air is greater than 15 cm of water after 60 seconds. More preferably, the pressure differential remains above 24 cm of water after 60 seconds.

The respiratory protection composite facepiece 11 can be formed by overmolding a thermosetting silicone material onto a thermoplastic rigid facepiece body 20. The thermosetting silicone material chemically bonds (i.e., adhesive bonding or covalent bonding) to the thermoplastic rigid facepiece body 20.

The terms "chemical bonding or chemically bonded" refer to physical processes responsible for the attractive interactions between atoms and molecules and includes covalent and ionic bonds, as well as hydrogen and van der Waal's bonds and can often depend on available functional groups on the rigid facepiece body 20 surface and their reactivity with the thermosetting silicone material. In many embodiments, the thermosetting silicone material is selected so that pretreatment of the thermoplastic rigid facepiece body 20 is not necessary. In other words, the thermosetting silicone material is self-adhesive with the thermoplastic rigid facepiece body 20. The thermosetting silicone material is often heated to cure the thermosetting silicone material during the overmolding process to a temperature sufficient to cure the thermosetting silicone material but less than a glass transition temperature of the thermoplastic rigid facepiece body 20.

As shown in the Examples below, the level of chemical bonding can be determined by the average force to failure test method. In many embodiments, the average force to failure is 25 N or greater, 50 N or greater, or 100 N or greater, or 150 N or greater, or 200 N or greater, or 300 N or greater.

The thermoplastic rigid facepiece body 20 can be formed of any useful thermoplastic material. In many embodiments, the thermoplastic rigid facepiece body 20 is formed of a polyamide (e.g., nylon), a polycarbonate, polybutyleneterephthalate, polyphenyl oxide, polyphthalamide, or mixtures thereof.

Any useful thermosetting liquid silicone rubber or material can be utilized to form the silicone sealing facepiece element 12 and second silicone element. Liquid silicone rubber is a high purity platinum cured silicone with low compression set, great stability and ability to resist extreme temperatures of heat and cold. Due to the thermosetting nature of the material, liquid silicone injection molding often requires special treatment, such as intensive distributive mixing, while maintaining the material cool before it is pushed into the heated cavity and vulcanized. Silicone rubber is a family of thermoset elastomerics that have a backbone of alternating silicone and oxygen atoms and methyl or vinyl side groups. Silicone rubbers constitute about 30% of the silicone family, making them the largest group of that family. Silicone rubbers maintain their mechanical properties over a wide range of temperatures and the presence of methyl-groups in silicone rubbers makes these materials hydrophobic.

Illustrative thermosetting silicone material includes self-adhesive liquid silicone rubbers available under the trade designation: ELASTOSIL LR 3070 from Wacker-Silicones, Munich, Germany; the KE2095 or KE2009 series (such as, for example, KE2095-60, KE2095-50, KE2095-40) or X-34-1547A/B, X-34-1625A/B, X-34-1625A/B all from Shin-Etsu Chemical Co., LTD., Japan. These self-adhesive liquid silicone rubbers do not require pretreatment of certain thermoplastic surfaces for the liquid silicone rubbers to chemically bond to the thermoplastic surface.

Figure 9:
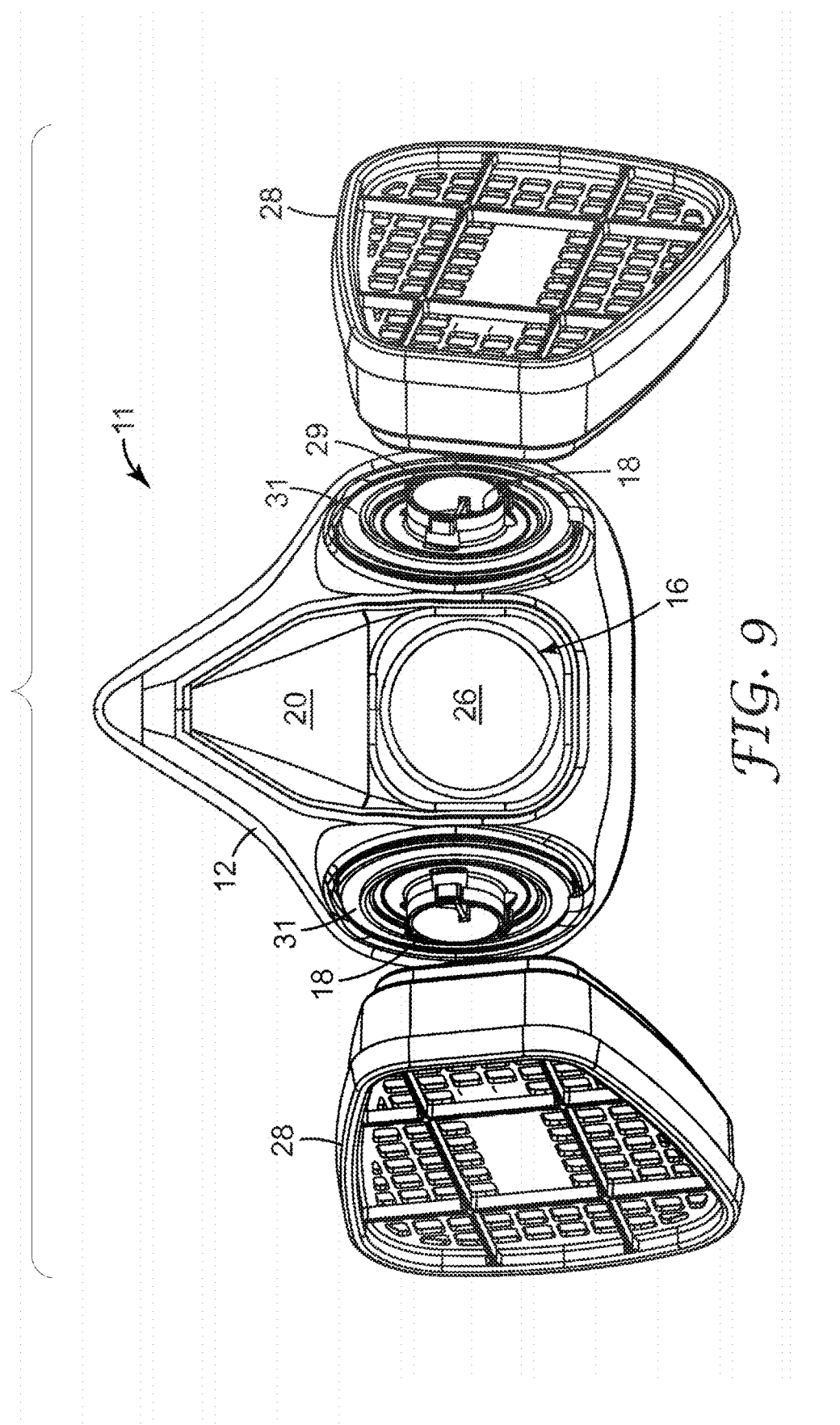
FIG. 9 is a perspective partial exploded view of an illustrative respiratory protection mask.

FIG. 9 is a perspective partial exploded view of an illustrative respiratory protection mask 11. The mask includes a rigid facepiece body 20 is described above, a silicone sealing facepiece element 12 is chemically bonded to the rigid facepiece body 20, a nose opening 16 and two cheek openings 18. At least one inhalation port 18 or valve including a diaphragm (i.e., second silicone element) and one exhalation port 16 or valve including a diaphragm 26 (i.e., second silicone element) is disposed within the plurality of ports or openings. A silicone gasket 31 (i.e., second silicone element) is disposed about the chemical or particulate filtration cartridge attachment element 29 and inhalation port 18 or valve. The silicone gasket 31 forms an air-tight seal with the chemical or particulate filtration cartridge 28 and the rigid facepiece body 20.

The silicone gasket 31 and silicone exhalation diaphragm 26 (and inhalation diaphragms) can be formed simultaneous or sequentially and chemically bonded to the to the rigid facepiece body 20. In some embodiments, silicone gasket 31 and silicone exhalation diaphragm 26 (and inhalation diaphragms) penetrate through the rigid facepiece body 20 as illustrated in FIGS. 2, 3, and 8.

The chemical or particulate filtration cartridge 28 to can be either fixedly attached or removably attached to the chemical or particulate filtration cartridge attachment element 29. The chemical or particulate filtration cartridge 28 can have any useful shape, other than the shape illustrated in FIG. 9.

EXAMPLES

Several tests were used to identify suitable combinations of silicone rubbers and thermoplastic materials. Of particular interest is the strength of the bond between the silicone rubber and thermoplastic material, which affects the durability of the air-tight seal.

The test strip is prepared by molding a rigid, flat substrate piece 51 mm long, 25 mm wide, and 2 mm thick with thermoplastic material. The substrate is then clamped into a second mold such that 6 mm of one end of the substrate protrudes into the cavity of the second mold. The cavity of the second mold is 27 mm wide and 49 mm long. The depth of the mold is 2 mm, expanding to 4 mm in the immediate vicinity of the protruding substrate end, such that when silicone is injected into the mold cavity it forms a layer 1 mm thick on all sides of the protruding substrate end. The resulting test strip is thus 94 mm long, with a rigid thermoplastic substrate piece on one end and silicone rubber on the other end.

The strength of the bond between the substrate material and silicone is measured by gripping the two ends of the test strip in the jaws of a mechanical tester such as an MTS Model 858 Material Test System (MTS Systems Corporation, Eden Prairie, Minn.), stretching it until the test strip breaks apart, and recording the force at which failure occurs. Examples of the force to failure are shown in Table 1. Examples 1 through 4 show that bond strengths greater than 300 N can be achieved with the appropriate combination of materials. For Comparative Examples C1 and C2, the silicone did not bond to the thermoplastic material.

| Example | Silicone | Thermoplastic Substrate | Average Force to Failure (N) |
|---------|----------|------------------------|------------------------------|
| 1 | Shin-Etsu KE2095 60 | RTP Nylon 6/6 | 136 |
| 2 | Wacker 3070-60 | RTP Nylon 6/6 | 303 |
| 3 | Dow LC-70-2004 | Zytel PA | 174 |
| 4 | Wacker 3070-60 | Zytel PA | 166 |
| C1 | Dow LC-70-2004 | RTP Nylon 6/6 | No bonding |
| C2 | Shin-Etsu KE2095 60 | Zytel PA | No bonding |

Dow LC-70-2004 silicone is produced by Dow Corning Corporation, Midland Mich.; RTP Nylon 6/6 is a polyamide produced by RTP Company, Winona, Minn.; Zytel PA is a polyamide produced by E.I. du Pont de Nemours, Wilmington, Del.

Thus, embodiments of the UNITARY RESPIRATOR WITH MOLDED THERMOSET ELASTOMERIC ELEMENTS are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A respiratory protection composite facepiece comprising:
    a polymeric rigid facepiece body portion having a first surface and a second surface;
    a silicone sealing facepiece element formed from thermosetting liquid silicone chemically bonded to at least one of the first surface or the second surface; and
    a second silicone element chemically bonded to at least one of the first surface or the second surface,
    wherein the polymeric rigid facepiece body portion further comprises an inhalation valve, an exhalation valve, or a speaking port, and the second silicone element forms a diaphragm for the inhalation valve, the exhalation valve, or the speaking port,
    wherein the polymeric rigid facepiece body portion comprises a plurality of apertures extending through the polymeric rigid facepiece body portion and the silicone sealing facepiece element interpenetrates at least a portion of the apertures, wherein the silicone sealing facepiece element is chemically bonded to the first surface and the second surface through the plurality of apertures.

2. A respiratory protection composite facepiece according to claim 1, wherein the polymeric rigid facepiece body portion comprises a thermoplastic polymer and the silicone sealing facepiece element and the second silicone element is a thermoset polymer and the thermoset polymer chemically bonds directly onto the thermoplastic polymer.

3. A respiratory protection composite facepiece according to claim 1, wherein the polymeric rigid facepiece body portion further comprises an inhalation valve and the second silicone element forms a gasket surrounding the inhalation valve.

4. A respiratory protection composite facepiece according to claim 1, wherein the second silicone element forms at least a portion of one or more straps configured to secure the respiratory protection composite facepiece to a user's head.

5. A respiratory protection composite facepiece comprising:
    a polymeric rigid facepiece body portion having a first surface and a second surface and a inhalation port; and
    a silicone sealing facepiece element formed from thermosetting liquid silicone chemically bonded to at least one of the first surface or the second surface and forming a gasket about the inhalation port,
    wherein the polymeric rigid facepiece body portion comprises a plurality of apertures extending through the polymeric rigid facepiece body portion and the silicone sealing facepiece element interpenetrates at least a portion of the apertures, wherein the silicone sealing facepiece element is chemically bonded to the first surface and the second surface through the plurality of apertures.

* * * * *